J. SMALLEY.
Wheel Cultivator.
No. 23,402.  Patented Mar. 29, 1859.
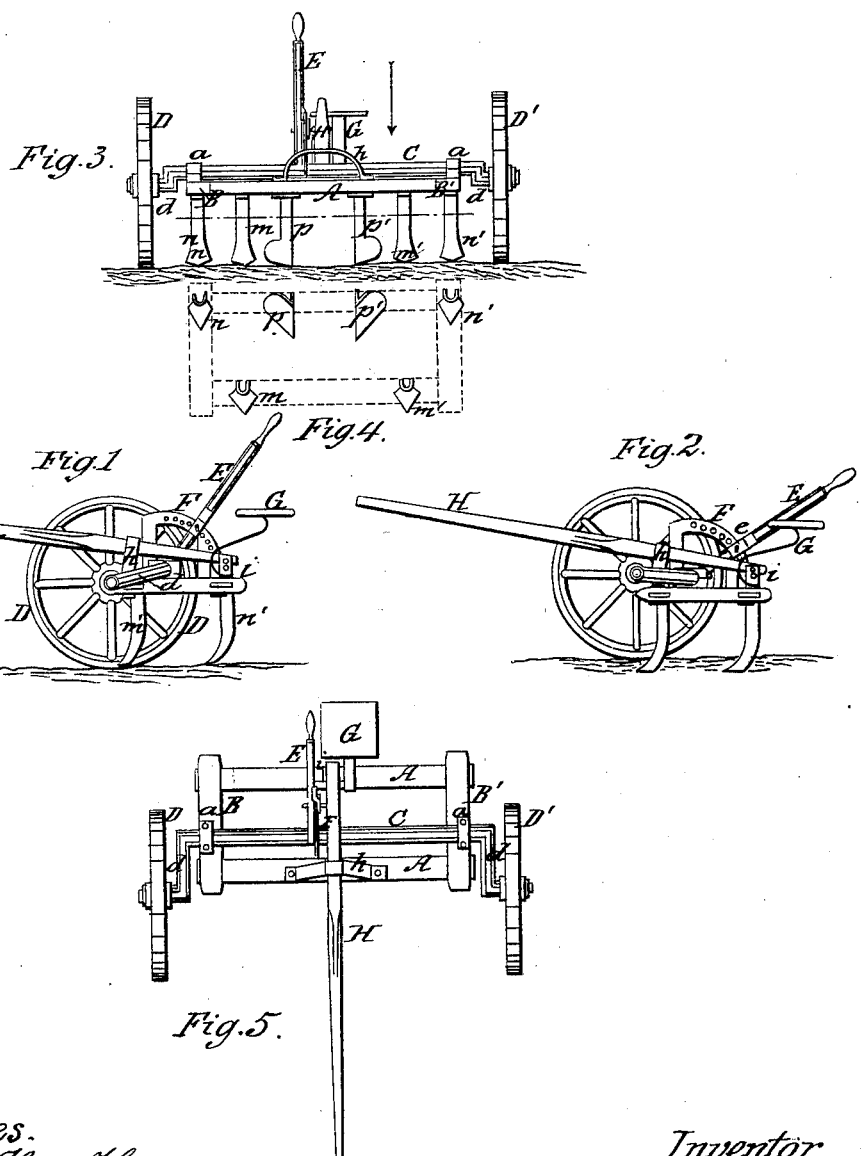

UNITED STATES PATENT OFFICE.

JOHN SMALLEY, OF BOUND BROOK, NEW JERSEY.

IMPROVEMENT IN CULTIVATORS.

Specification forming part of Letters Patent No. 23,402, dated March 29, 1859.

*To all whom it may concern:*

Be it known that I, JOHN SMALLEY, of Bound Brook, Somerset county, and State of New Jersey, have invented certain new and useful Improvements in Cultivators; and I do hereby declare the following to be a full, clear, and exact description of the same, reference being had to the accompanying drawings, and to the letters of reference marked thereon.

My invention relates to that class of cultivators used for tearing up the soil near the ridges of planted corn; and my improvements consist in a frame having an adjustable pole, certain teeth, described hereinafter, a cranked shaft and central lever, and driver's seat, the latter being so arranged in respect to the lever that the driver can operate the lever without rising from his seat, and the whole of the parts being arranged in respect to each other substantially as set forth hereinafter, and forming, when combined, a compact, serviceable cultivator, and one capable of being easily managed and readily adjusted.

In order to enable others to make and use my invention, I will now proceed to describe its construction and operation.

On reference to the accompanying drawings, which form a part of this specification, Figure 1 is a side view of my improved cultivator; Fig. 2, the same with the frame and its teeth lowered; Fig. 3, a front view; Fig. 4, a plan showing the cultivator-teeth and their disposal in respect to each other; Fig. 5, a top view.

Similar letters refer to similar parts throughout the several views.

The frame is composed of the longitudinal rear and front beams, A and A', permanently secured to the opposite side beams, B and B', and to a beam situated between the latter. On each of the side beams is a box, *a*, and in these opposite boxes is hung the axle C, the ends of which are cranked at *d*, and to each of the cranked ends is hung one of the main wheels, D and D'.

To the axle C, and at a point nearly midway between the opposite cranked ends, is secured a lever, E, a bracket, *e*, on the latter maintaining it in close contact with the quadrant F, which is secured to the intermediate beam of the frame. This quadrant has a number of holes, into any of which may be fitted a retaining-pin, which passes through the bracket *e*, lever E, and the quadrant F.

A driver's seat, G, is secured to the rear beam, A, of the frame in such a position that the driver can control the lever E.

H is the pole, which passes freely through a staple, *h*, on the front beam, A, of the frame, and between the two plates *i i* on the rear beam, there being a series of holes in these plates and a single hole in the end of the pole, so that the latter may be secured by a pin passing through any of the holes in the plates and through the hole in the end of the beam.

To the under side of the frame are secured the cultivator-teeth, two teeth, *m* and *m'*, to the front beam, A, the two teeth *n* and *n'* to the opposite side beams, and the two teeth *p* and *p'* to the rear beam, A', of the frame. The form and disposal of these teeth in respect to each other will be best observed on reference to Fig. 4. The two front teeth, *m* and *m'*, are inclined on both edges, and are situated, one a short distance from one end and the other an equal distance from the opposite end of the frame. The teeth *n* and *n'* are similar to the front teeth, and the intermediate teeth, *p* and *p'*, are shaped somewhat after the manner of a plowshare, both being inclined on one side and parallel with the line of the draft of the machine on the other. These two intermediate teeth are so attached to the frame that they can be readily removed and their positions changed, by which the inclined sides of both teeth may be directed outward, as seen in Fig. 4, or changed so as to be directed inward.

The machine is especially intended for the cultivation of corn, and is in this instance arranged to operate on the ground planted in ridges four feet apart, the distance between the treads of the wheels being about six feet. The machine is drawn over the ground so that the intermediate plow-shaped teeth, *p* and *p'*, may be at equal distances on each side of the ridge. While the teeth *m* and *m'* and *n* and *n'*, therefore, are loosening the intermediate soil between the ridges the plow-teeth are cutting into and directing the soil on each side from the planted ridge. This, however, is only the case when there is a superabundance of soil about the ridge. Should there be a scarcity of soil at this point, the intermediate plow-teeth are detached from the frame and their positions changed, the tooth $p'$ occupying the place formerly occupied by the tooth $p$ and the latter taking the place of the tooth $p'$. When in this position it will be readily seen that the inclined sides of the teeth will direct the soil onto the ridge to supply any deficiency.

The depth to which the teeth penetrate the ground will depend upon the position of the lever E, for when that lever is depressed, as seen in Fig. 2, the teeth will project below the periphery of the wheel, and when the lever is raised, as in Fig. 1, the points of the teeth are nearly on a level with the periphery of the wheel.

By the peculiar arrangement of the cranked axle, the lever E, and the seat G the driver can at once make any alteration he may desire in the depth of the cut.

It is desirable that the points of the teeth should have more or less pitch—that is, that they should have a downward or upward inclination—according to the nature of the soil, and to suit the depth to which they have penetrated. This pitch is effected by the adjustability of the end of the pole between the plates $i$.

It will be readily seen that as the front end of the pole always retains the same altitude the lower the rear end is adjusted the greater will be the downward inclination of the teeth, and the more the rear end of the pole is raised the greater will be the upward inclination. The cranked axle is so situated on the frame and the cranks are of such a length that the tread of the wheels coincides with the line of the front teeth of the cultivator. It will be at once seen that by this arrangement the weight of the machine is entirely removed from the backs of the horses.

I do not claim broadly hanging the main wheels of a cultivator to cranked axles for the purpose of deciding the depth to which the teeth shall penetrate the ground, as such a device has been heretofore used in cultivators; nor do I claim a central lever for operating the cranked axle, or the plow-formed teeth, or any other part of the machine separately; but

I claim and desire to secure by Letters Patent—

The frame, its adjustable pole, its teeth $m$ $m'$ $n$ $n'$, and detachable teeth $p$ $p'$, the cranked shaft C, its central lever, E, and driver's seat G, when the said seat is so situated as regards the handle that the driver can operate the latter without moving from the seat, and when the whole of the parts are arranged in respect to each other substantially as set forth.

In testimony whereof I have signed my name to this specification in the presence of two subscribing witnesses.

JOHN SMALLEY.

Witnesses:
HENRY HOWSON,
HENRY ODIORNE.